United States Patent Office 3,314,806
Patented Apr. 18, 1967

---

3,314,806
PRODUCTION OF REFRACTORY OBJECTS
Harold Garton Emblem, Grappenhall, and Stanley Arthur Trow, Salford, England, assignors to Philadelphia Quartz Company, Philadelphia, Pa., a corporation of Pennsylvania
No Drawing. Filed June 5, 1963, Ser. No. 285,615
Claims priority, application Great Britain, June 6, 1962, 21,844/62
10 Claims. (Cl. 106—38.2)

This invention relates to the production of refractory objects, more especially although not exclusively to the manufacture of refractory moulds for the precision casting of metals and alloys.

According to the invention there is provided a method of producing a refractory object comprising mixing refractory powder with a binder liquid comprising an isopropyl silicate, sufficient water for the hydrolysis and gelation of the silicate and a base as a hydrolysis and gelation accelerator, giving the mixture the desired shape, and allowing the binder to set to a gel. It has been discovered that above binder liquids have the unexpected property that their gelation times are related to the concentration of the base, for any one base, in accordance with the equation $y = mx + c$, where $y$ is the reciprocal of the gel time, $x$ is the number of equivalents of the base in the binder liquid, and $m$ and $c$ are constants. A plot of $x$ against $y$ for any one base therefore gives a straight line. The use of isopropyl silicates in accordance with the invention thus enables one to readily determine the concentration of base required to cause the binder to set at the desired time. The above linear relationship holds for a constant concentration of water in the binder liquid. With increase in the water content the respective gelation times decrease.

The isopropyl silicate may be the orthosilicate but a silicate consisting at least mainly of isopropyl polysilicate material is preferably employed by reason of its higher silica content.

A wide variety of bases may be used. Among those bases that are sufficiently strong to accelerate the hydrolysis and gelation of the silicate are piperidine, isopropylamine, monoethanolamine, triethanolamine, n-butylamine, sec-butylamine, di- n-butylamine, di- n-propylamine, ammonia and hydrazine. Also those reaction products of oxirane compounds and aminoalkyl silicates described in co-pending application 71,156, now U.S. Pat. 3,110,601, which are water stable may be used as the base; typical of such products is the reaction product of 1:2-butylene oxide and tetra (2-aminoethoxy) silane.

It is desirable to include in the binding liquid isopropyl alcohol or other mutual solvent for the isopropyl silicate and the water.

The use of the above binder liquids in the investment casting process is particularly advantageous in view of the accurate control over gelation that is possible and for other reasons which will be apparent from the following.

In the well-known precision casting process an expendable pattern, usually of wax, is invested in a mixture of a refractory material and subsequently the pattern is removed such as by melting or dissolving out to produce a mould in which, after firing, metal or alloy is cast. Prior to the investment the pattern is usually first given a thin coating of a fine refractory material. The method usually used in the production of the investment is to surround the pattern in a moulding box or flask with a slurry of the refractory in a liquid binder medium. The refractory then packs to a compact mass around the pattern; usually the moulding box or flask is vibrated to assist the packing. Finally when the binder has set the pattern is removed. It is of great practical importance that adequate packing of the refractory should occur before the binder has set.

Among the binder liquids used hitherto have been acid-hydrolysed ethyl and isopropyl silicate solutions. Such solutions can be made to remain sufficiently fluid during the packing, which usually takes from 1 to 2 hours, to permit the desired degree of packing to be obtained. The setting of such binder liquid occurs by the gelation of the acid-hydrolysed solution. This gelation can be made to occur after the packing of the refractory by the application of heat or by the inclusion in the binder liquid of a small amount of an alkaline material such as magnesium oxide. It is usually desired that gelation of the binder should not occur for at least 5 hours, the desired gelation time of the binder frequently being between 6 and 10 hours.

It is well known that ethyl silicate can be hydrolysed and gelled under alkaline conditions by mixing it with a suitable amount of water and a sufficiently basic amine. However, particularly when organic amines are used as gelation catalysts, ethyl silicate usually gels within a comparatively short time.

It is a requisite of the investment process that the binder of the investment should not gel for some hours. A further important requirement is that during the first one to two hours after investment of the pattern the viscosity of the binder liquid should not increase to such an extent that satisfactory packing or consolidation of the refractory around the pattern is prevented or hindered. It is because of these requirements, and especially the second one, that there is seldom if ever used commercially the alkaline hydrolysis and gelation technique for the setting of an ethyl silicate investment binding liquid.

In connection with the use of isopropyl silicates in accordance with the invention it has been further discovered that the increase in the viscosity of the binder liquid during the early stages of the hydrolysis and gelation sequence is relatively small and that its use in the investment process readily permits of adequate packing or consolidation of the refractory around the mould pattern.

Thus according to one particular embodiment of the present invention there is provided a method of investing a mould pattern in which method the binder liquid of the investment comprises an isopropyl silicate, water and a base as an accelerator for the hydrolysis and gelation of the silicate, the binder liquid preferably having a gelation time of at least five hours.

The following examples illustrate the invention. The isopropanol used in the examples contained 0.077% wt./vol. of water. The isopropyl polysilicate used contained 38% $SiO_2$, and 10% of isopropyl orthosilicate.

*Example 1*

A solution of 400.2 g. of isopropanol and 114.8 g. of water was prepared. 25.75 g. aliquots of the above solution was taken and 19.25 g. of isopropyl polysilicate added. Varying amounts of 25% (wt./vol.) piperidine in isopropanol were added, the final weight being made up to 50 g. with isopropanol. The time taken from the addition of the base to the time a soft gel first formed was taken to be the gel time. The details of the experiments and results are summarised in Table 1.

TABLE 1

| Ml. of 25% Base Solution | Gel Time, mins. | No. of Equivalents of Base | 1 Gel Time (Hours) |
|---|---|---|---|
| 5 | 27 | .01468 | 2.2 |
| 4 | 40 | .01175 | 1.5 |
| 3 | 50 | .00882 | 1.2 |
| 2 | 92 | .00588 | 0.653 |
| 1 | 302 | .00294 | 0.199 |
| 0.5 | 1,410 | | |

A straight line was obtained by plotting the reciprocal of the gel time in hours against the number of equivalents of the amine.

*Example 2*

The procedure in Example 1 was repeated save in that a 25% wt./vol. solution of isopropylamine in isopropanol was used instead of the piperidine solution. The results are tabulated in Table 2.

TABLE 2

| Ml. of 25% Base Solution | Gel Time, mins. | No. of Equivalents of Base | 1 Gel Time (Hours) |
|---|---|---|---|
| 4 | 24 | .01697 | 2.5 |
| 3 | 32 | .0127 | 1.873 |
| 2 | 55 | .00849 | 1.091 |
| 1.5 | 80 | .00636 | .753 |
| 1.0 | 156 | .00424 | .385 |
| 0.5 | 305 | .00212 | .196 |

*Example 3*

The procedure in Example 1 was again repeated save in that a 25% wt./vol. solution of n-butylamine in isopropanol was employed instead of the piperidine solution. The results are given in Table 3.

TABLE 3

| Ml. of 25% Base Solution | Gel Time, mins. | No. of Equivalents of Base | 1 Gel Time (Hours) |
|---|---|---|---|
| 4 | ¹26 | .01371 | 2.31 |
| 3 | ¹35 | .01027 | 1.713 |
| 2 | 51 | .00686 | 1.177 |
| 1.5 | 77 | .00514 | .7815 |
| 1.0 | 136 | .00343 | .441 |
| 0.5 | 299 | .0017 | .2 |

¹ About.

A straight line was obtained by plotting the reciprocal of the gel time in hours against the number of equivalents of the base.

*Example 4*

The procedure in Example 1 was again repeated save in that a 25% wt./vol. solution of hydrazine hydrate in isopropanol was employed instead of the piperidine solution. The results are given in Table 4.

TABLE 4

| Ml. of 25% Base Solution | Gel Time, mins. | No. of Equivalents of $H_2NNH_2$ | 1 Gel Time (Hours) |
|---|---|---|---|
| 4 | 51 | .04 | 1.118 |
| 3 | 82 | .028 | .732 |
| 2 | 154 | .02 | .39 |
| 1.5 | 309 | .015 | .194 |
| 1.0 | 480 | .010 | .125 |

A straight line was obtained by plotting the reciprocal of the gel time in hours against the number of equivalents of the base.

*Example 5*

The procedure of Example 1 was again repeated save in that instead of a 25% wt./vol. solution of piperidine in isopropanol, there was used a 25% wt./vol. solution in isopropanol of the reaction product of 1:2 butylene oxide and tetra (2-aminoethoxy) silane prepared by the method described in Example 21 of the complete specification of co-pending application 71,156, now U.S. Pat. 3,110,601. The results are given in Table 5.

TABLE 5

| Ml. of 25% Base Solution | Gel Time, mins. | No. of Equivalents of Base | 1 Gel Time (Hours) |
|---|---|---|---|
| 5 | 228 | 0.00593 | 0.263 |
| 4 | 297 | 0.00474 | 0.202 |
| 3 | 424 | 0.00355 | 0.141 |

A straight line was obtained by plotting the reciprocal of the gel time in hours against the number of equivalents of the base.

*Example 6*

A solution containing 236 g. of isopropanol and 192.5 g. of isopropyl polysilicate was prepared. 42.85 g. samples of the above solution were taken and varying amounts of concentrated ammonia (28% wt./vol.) added by burette. The total weight of water in the solution was made up to the figure in the previous examples by adding water from a burette. The total weight was made up to 50 g. with isopropanol. The gel times were determined as before. The results are given in Table 6.

TABLE 6

| Ml. of $NH_3$ Solution | Ml. of Water | Gel Time, mins. | No. of Equivalents of Base | 1 Gel Time (Hours) |
|---|---|---|---|---|
| 3.6 | 3.95 | <9 | .0593 | >6.67 |
| 2.7 | 4.5 | 9 | .0445 | 6.67 |
| 1.8 | 5.05 | 16 | .0297 | 3.75 |
| 1.35 | 5.35 | 21 | .0222 | 2.86 |
| 0.9 | 5.6 | 37 | .0148 | 1.62 |
| 0.45 | 5.9 | 152 | .0074 | .395 |

A straight line was obtained by plotting the reciprocal of the gel time in hours against the number of equivalents of the base.

*Example 7*

A solution containing 80.08 g. of isopropanol, 22.96 g. of water and 77.00 g. of isopropyl polysilicate, 0.9 ml. of 25% (wt./vol.) solution of piperidine in isopropanol and made up to 200 g. with isopropanol was prepared and the viscosity measured periodically by means of a Ferranti Viscometer. The results are given in Table 7.

TABLE 7

| Time (Mins.) | Viscosity (centipoises) | Time (Mins.) | Viscosity (centipoises) |
|---|---|---|---|
| 0 | 5.29 | 267 | 10.57 |
| 13 | 5.6 | 276 | 10.96 |
| 23 | 5.6 | 292 | 11.72 |
| 33 | 5.91 | 299 | 12.29 |
| 48 | 6.14 | 311 | 13.6 |
| 69 | 6.375 | 323 | 14.3 |
| 87 | 6.61 | 336 | 16.17 |
| 93 | 6.765 | 359 | 20.6 |
| 113 | 7.075 | 363 | 24.7 |
| 150 | 7.785 | 383 | 28.9 |
| 163 | 7.78 | 398 | 41.8 |
| 228 | 8.95 | 413 | 60.4 |
| 249 | 9.95 | 420 | 72.0 |
| | | 428 | Gelled |

From Table 7 it can clearly be seen that there is relatively little increase in the viscosity of the solution in the early stages of the hydrolysis and gelation process. The solution is therefore admirably suitable for use as a binding liquid for the investment in the precision casting process of making moulds.

Example 8

20.02 g. of isopropanol, 5.74 g. of water, 19.25 g. of isopropyl polysilicate and 1 ml. of 25% (wt./vol.) solution of piperidine in isopropanol were mixed and the weight made up to 50 g. with isopropanol.

To the solution was added 250 g. of refractory powder and thoroughly mixed. The mixture was cast in a crucible mould and left for 8 hours. The resulting casting was removed and fired at 1100° C. for 8 hours to give a firm casting with good surface finish.

Example 9

20.02 g. of isopropanol, 5.74 g. of water, 19.25 g. of isopropyl polysilicate and 5 mls. of 25% (wt./vol.) solution, in isopropanol, of the 1:2-butylene oxide-tetra (2-aminoethoxy) silane reaction product referred to in Example 5 were made up to 50 g. with isopropanol and mixed.

To the solution was added 250 g. of refractory powder which was mixed thoroughly and cast in a crucible mould and left for 4½ hours. The resulting casting was removed and fired at 1100° C. for 8 hours.

Example 10

80.08 g. of isopropanol, 22.96 g. of water, 77.0 g. of isopropyl polysilicate and 4 ml. of 25% (wt./vol.) solution of piperidine in isopropanol were mixed, and the weight made up to 200 g. with isopropanol.

To the solution was added 1000 g. of refractory powder and thoroughly mixed. The mixture was then used to surround a wax pattern in a moulding box. The moulding box was vibrated for about an hour to assist the packing. The mixture was then left for a further 7 hours by which time the mixture had set. The wax pattern was removed by melting and the investment was then fired at 1100° C. for 8 hours.

The refractory powder used in Examples 8, 9 and 10 consisted of a mixture of zircon and calcined kaolin, the mixture being of such particle size that all passed a 10 mesh sieve and 20% by weight of the mixture passed a 200 mesh sieve.

What is claimed is:

1. A method for producing a binder composition having a gelation time of at least five hours, which comprises admixing:
    (a) an isopropyl silicate selected from the group consisting of isopropylorthosilicate, isopropyl polysilicate and admixtures thereof,
    (b) sufficient water for the hydrolysis and gelation of the silicate, and
    (c) a base as a hydrolysis and gelation accelerator, said base being selected from the group consisting of piperidine, isopropylamine, monoethanolamine, tri-ethanolamine, n-butylamine, sec-butylamine, di-n-butylamine, di-n-propylamine, ammonia, hydrazine and water stable reaction products of oxirane compounds and aminoalkyl silicates.

2. A method according to claim 1 wherein the binder composition also contains a mutual solvent for the isopropyl silicate and water.

3. A method according to claim 2 wherein the mutual solvent comprises isopropyl alcohol.

4. A method for producing a binder composition having a gelation time of at least five hours, which comprises admixing:
    (a) an isopropyl silicate selected from the group consisting of isopropyl orthosilicate, isopropyl polysilicate and admixtures thereof,
    (b) sufficient water for the hydrolysis and gelation of the silicate, and
    (c) a nitrogenous base as a hydrolysis and gelation accelerator.

5. A method according to claim 4 wherein the nitrogen base is piperidine.

6. A method according to claim 4 wherein the nitrogen base is isopropylamine.

7. A method according to claim 4 wherein the nitrogen base is monoethanolamine.

8. A method according to claim 4 wherein the nitrogen base is triethanolamine.

9. A method according to claim 4 wherein the nitrogen base is ammonia.

10. A method according to claim 4 wherein the nitrogen base is n-butylamine.

References Cited by the Examiner

UNITED STATES PATENTS

| | | | |
|---|---|---|---|
| 2,660,538 | 11/1953 | Emblem et al. | 106—287 |
| 2,806,270 | 9/1957 | Shaul | 22—196 |
| 3,070,861 | 1/1963 | Emblem et al. | 22—193 |
| 3,110,601 | 11/1963 | Emblem et al. | 106—8 XR |
| 3,112,538 | 12/1963 | Emblem | 22—193 |

ALEXANDER H. BRODMERKEL, *Primary Examiner.*

MORRIS LIEBMAN, SAMUEL H. BLECH, *Examiners.*

J. B. EVANS, *Assistant Examiner.*